(12) United States Patent
Krispin et al.

(10) Patent No.: US 11,809,794 B2
(45) Date of Patent: Nov. 7, 2023

(54) SYSTEM AND METHOD FOR SIMULATING TURBULENCE

(71) Applicant: Vorcat, Inc., Woodland Hills, CA (US)

(72) Inventors: Jacob Krispin, Woodland Hills, CA (US); James Collins, Frankford, DE (US); Isaac Lottati, Sherman Oaks, CA (US)

(73) Assignee: Corcat, Inc., Woodland Hills, CA (US)

(*) Notice: Subject to any disclaimer, the term of this patent is extended or adjusted under 35 U.S.C. 154(b) by 197 days.

(21) Appl. No.: 17/083,253

(22) Filed: Oct. 28, 2020

(65) Prior Publication Data

US 2021/0124861 A1    Apr. 29, 2021

Related U.S. Application Data

(60) Provisional application No. 62/926,856, filed on Oct. 28, 2019.

(51) Int. Cl.
*G06F 113/08* (2020.01)
*G06F 30/28* (2020.01)

(52) U.S. Cl.
CPC .......... *G06F 30/28* (2020.01); *G06F 2113/08* (2020.01)

(58) Field of Classification Search
CPC ....... G06F 30/28; G06F 2113/08; Y02T 90/00
See application file for complete search history.

(56) References Cited

U.S. PATENT DOCUMENTS

| 3,787,874 | A | 1/1974 | Urban |
| 4,727,751 | A | 3/1988 | Holmes et al. |
| 6,464,459 | B2 | 10/2002 | Illingworth |
| 6,512,999 | B1* | 1/2003 | Dimas ............... G06T 13/20 703/2 |
| 9,898,682 | B1 | 2/2018 | Sieracki et al. |
| 10,282,885 | B2 | 5/2019 | Angelidis |
| 2011/0024552 | A1* | 2/2011 | Patt .............. B64C 29/0033 244/6 |
| 2019/0051195 | A1* | 2/2019 | De La Guardia Gonzalez ........... G08G 5/0008 |
| 2020/0300227 | A1* | 9/2020 | Evans ............... F03D 17/00 |

OTHER PUBLICATIONS

Collins et al., "Modeling Thermally Driven Flow Problems with a Grid-Free Vortex Filament Scheme: Part I," *US Army Research Laboratory* ARL-TR-8296. Feb. 2018 [retrieved on Mar. 2, 2021], retrieved from the internet <URL: https://apps.dtic.mil/dtic/tr/fulltext/u2/1O484O7.odff, pp. 1-17.

Abedi, Hamidreza, "Aerodynamic Loads on Rotor Blades: Master's Thesis," *Chalmers University of Technology*, 2011 [retrieved on Mar. 2, 2021), retrieved from the internet <URL: http://www.tfd.chalmers.se/~lada/postscript files/hamid thesis.odf, pp. 1-27, 87-95.

(Continued)

*Primary Examiner* — Steven W Crabb
(74) *Attorney, Agent, or Firm* — Guy Levi; The IP Law Firm of Guy Levi, LLC

(57) ABSTRACT

A system and method for simulation of fluid flow. The system being configured to remove loops in a vortex filament in a simulation model and reconnect the filament. The system may also be configured to model fluid flow in relation to a moving object and to correct errors in surface vorticity.

8 Claims, 15 Drawing Sheets

(56) References Cited

OTHER PUBLICATIONS

Tryggeson, Analytical Vortex Solutions to the Navier-Stokes Equation. Vaxjo University. 2007 (retrieved on Dec. 28, 2020], retrieved from the internet on <URL: www.diva-portal.org/smash/get/diva2:205082/FULLTEXT01.pdf, pp. 1-19.
PCT/US2020/057805 International Search Report and Written Opinion, dated Jan. 22, 2021.
Liu et al., "A random particle blob method for the Keller-Segel equation and convergence analysis," Oct. 29, 2015, pp. 1-25.
Moin, P., "Numerical and physical issues in large eddy," *JSME Int. J. B-Fluid*, vol. 41, No. 2, pp. 454-463, 1998.
Moin, P., "Numerical issues in large eddy simulation of complex turbulent flows and application to aeroacoustics," in *Advanced Turbulent*, New York, R. Peyret et al. (eds). Springer-Wien, 2000, pp. 131-154.
Speziale, C.G., "On the Advantages of the Vorticity-Velocity Formulation of the Equations of Fluid Dynamics," *Journal of Computational Physics*, vol. 73, No. 2, pp. 476-480, 1987.
Woyte, A., "Clusterdesign (A Toolbox for Onshore Wind Farm Cluster Design," European Commission, 2016.
Yokota, R., "GitHub," Feb. 26, 2019. [Online]. Available: https://github.com/exafmm/exafmm.

\* cited by examiner

SYSTEM AND METHOD FOR SIMULATING TURBULENCE

CROSS REFERENCE TO RELATED APPLICATIONS

This application claims priority to U.S. Provisional Application No. 62/926,856, filed on Oct. 28, 2019, the entirety of which is incorporated by reference herein.

STATEMENT OF GOVERNMENT RIGHTS

This invention was made with government support under Grant No. DE-SC0018547 awarded by the Department of Energy. The government has certain rights to the invention.

BACKGROUND

Computational fluid dynamics (CFD), which is the analytics and prediction of fluid flow, impacts many industries. The efficiency and performance of a race car, an airplane or a wind turbine farm, for example, may depend on an understanding of the fluid flow and the turbulence generated by the relative motion between the fluid and an obstacle (e.g., race car, airplane fuselage, turbine blade, etc.).

There have been many attempts in the past to gain a better understanding of fluid flow and turbulence. For example, U.S. Pat. No. 3,787,874 disclosed a method of making boundary layer flow conditions visible by a reactive layer of a colored chemical indicator to the surface of an object exposed to fluid flow. Also, U.S. Pat. No. 4,727,751 disclosed a mechanical sensor for determining cross flow vorticity characteristics. The sensors contained hot-film sensor elements which operate as a constant temperature anemometer circuit to detect heat transfer rate changes.

Systems that simulate CFD may be referred to as CFD simulation systems. Some CFD simulation systems attempted to model the fluid flow by covering the entire fluid flow domain with a large mesh or grid. Such grid-based simulations, however, were inefficient and lacking in accuracy due to a failure to address the real physics in fluid flows, particularly those with high Reynolds number turbulence. For example, some CFD simulation systems employ Reynolds Averaged Navier-Stokes (RANS) and Large Eddy Simulation (LES) methods. These methods incorporate diffusive models for transport correlations with the result that they model high Reynolds number turbulence as a fictitious low Reynolds number, variable viscosity flow. Unfortunately, these models do not accurately reflect the physics of high-Reynolds-number turbulence. In fact, considerable evidence to the contrary has been found in many applications of RANS models. Moreover, sub-grid models in LES, including the dynamic model, purposefully take on a diffusive form to guarantee numerical stability, even though this prevents them from accounting for such important physical phenomena as energy backscatter to large scales.

The breakthrough work of Alexandre J. Chorin of the University of California at Berkeley, however, attained a tremendous advantage in understanding and predicting fluid flow. Chorin's vortex method used vorticity of fluid to better understand the basis for fluid flow. In the vortex method a flow field is represented by a collection of convicting and diffusing vortex elements. This method has negligible if any numerical diffusion so that high Reynolds number turbulence effects can be represented with high numerical accuracy and fidelity. The method is grid-free so that it can be easily applied to engineering flows in complex geometries. Moreover, the method is naturally adaptive since the computational elements occupy only the relatively small support of the flow field where the vorticity is significant.

Vortex methods like Chorin's, however, present at least two problems that have limited their appeal. First, vortex methods indiscriminately track the dynamics of individual vortical structures as they stretch and fold causing the number of vortices can grow to unmanageable levels. Second, the computational time associated with the nominally $O(N_v^2)$ operations implicit in the Biot-Savart law evaluation of velocities based on $N_v$ vortex elements, an essential aspect of the formulation of the vortex method and a source of its unique advantages, can increase beyond reasonable levels for engineering use. An additional concern, which pertains to traditional random vortices, for example the vortex particle or vortex blob discussed in J. Liu & R. Yang, *A random particle blob method for the Keller-Segel equation and convergence analysis*, Math. Comp. 86 (2017), 725-745, is the noise introduced by a random walk diffusion model: unless a very fine coverage of vortex elements is employed, the random walk diffusion model can easily exceed the levels found in real turbulent flows.

Additional challenges with vortex methods are discussed in U.S. Pat. No. 6,512,999 ("the '999 Patent"), entitled Apparatus and Method for Simulating Turbulence, issued Jan. 28, 2003, and incorporated by reference herein in its entirety. The '999 Patent attempted to address some of the challenges and limitations of vortex methods. For example, the '999 Patent used "vortex sheets" to model fluid flow near a boundary or wall of an object in the fluid flow. The vortex sheets were composed of a grid or mesh of one or more geometrically shaped (for example, triangular or triangular prismatic shaped) space filling elements. The '999 Patent used a Eulerian approach for these the vortex sheets. The '999 Patent also used "vortex tubes" and "filaments" for other CFD elements, and used a Lagrangian approach for these elements. The '999 Patent further used a hairpin removal scheme to reduce the number of vortex filaments, and a Fast Multipole Method (FMM) to reduce the computation time of the velocity field.

Vortex sheets are arrayed in thin layers along all solid surfaces for the purpose of accurately and efficiently capturing the vorticity creation process within the viscous sublayer of turbulent flow. In fact, such regions, which are set up in response to the no slip condition, tend to be large and thin and so best characterized via a vortex sheet structure. The vortex sheets may be in the form of an unstructured triangularization, over several parallel layers. This is well tuned to capturing the complex geometrical features found in many applied problems but without the onerous task of devising a grid to cover the entire flow domain. The use of thin vortex sheets in a fixed array allows for the use of an accurate finite volume solution of the governing vorticity equation, and for an efficient representation of wall-normal viscous diffusion through the sheet layer, which may be the most significant viscous effect in viscous flow.

The vortex sheet structure may also provide a framework out of which new vortex tubes are placed into the flow to simulate the vortex creation process in turbulence. The latter, driven by quasi-streamwise vortices, generally occurs during significant turbulent ejection events. In the simulation, the vortex elements may naturally combine to create the circumstances under which new vortices appear.

The accuracy of any analysis, however, was limited by the complexity and frequency of calculations as well as the physical limitations of available computer hardware. For example, many of the prior systems discussed above required a substantial amount of estimation and/or guesswork, thereby impacting the accuracy of these systems. In addition, many of these systems and methods performed computationally unnecessary modeling of the smallest turbulent scales that consumes system resources and prolongs the CFD simulation. Operating these vortex simulation systems was time consuming and may have required as much as days or weeks to set up the system for a simulation. Also, many of the systems required a higher level of expertise to operate, which may increase costs.

In addition, existing CFD simulation systems are not capable of effectively, efficiently and accurately modeling surface vorticity, moving boundaries and/or rotors, or synthetic jets. Moreover, most existing CFD simulation systems are not capable of taking advantage of exascale computing architecture. Existing CFD simulation systems also have difficulty capturing turbulence even with highly refined grids making it nearly impossible to do so when low-fidelity solutions are required for building such models.

One illustrative use of CFD simulation is in automotive and aerospace design, where systems for designing an automobile seek to, for example, reduce drag, improve controllability and/or mitigate noise by employing vortex methods to simulate turbulence. Existing automobile design systems, however, may use various turbulence models that produce different results and lead to uncertainty in their value as high as 31%. Examples of such systems are discussed in the following, which are each incorporated by reference herein in their entirety: R. Yokoda, "GitHub," Feb. 26, 2019, available at https://github.com/exafmm/exafmm; C. G. Speziale, "On the advantages of the vorticity-velocity formulation of the equations," Journal of Computational Physics, vol. 73, no. 2, pp. 476-480, 1987; P. S. Bernard, "Turbulent flow properties of large scale vortex systems," Proc. Nat. Acad. Sci., vol. 103, pp. 10174-10179, 2006; P. S. Bernard, "Gridfree simulation of the spatially growing mixing layer," AIAA J., vol. 46, pp. 1725-1737, 2008. These systems may have also required complex grids to be prepared before the simulation, which involved a substantial amount of time.

Another issue with automobile design systems is that synthetic jet flow controls may be unable to accurately model synthetic jets because, for example, they rely on estimation or guesswork. For example, as discussed in P. Moin, "Numerical and physical issues in large eddy," JSME Int. J. B-Fluid, vol. 41, pp. 454-463, 1998, which is incorporated by reference herein in its entirety, the systems may require estimating which of several turbulence models most closely reflects certain physical experiments (i.e., calibration of CFD data to experimental data).

The above-described issues with CFD simulations have also impacted wind turbines and wind turbine farms. Maximizing energy generation and life cycle while minimizing the levelized cost of onshore and offshore wind turbine farms may be complex. As discussed in P. S. Bernard, P. Collins and M. Potts, "Vortex filament simulation of the turbulent boundary layer," AIAA Journal, vol. 48, no, 8, 2010, which is incorporated by reference herein in its entirety, factors involved in optimizing wind turbine farm/wind turbine design include turbine spacing, turbulent wake evolution and blockage generated by interference of multiple wakes with the surroundings.

Current wind turbine/turbine farm design systems, however, do not provide accurate simulations of the complex turbulent wakes that are produced by the rotors and then interact with surrounding solid structures including the tower itself, the ground or water beneath the rotors, and the ensuing complex interaction of all the wakes in the wind farm. The current systems also may not account for site-specific meteorological conditions. Understanding and accurately predicting such complex CFDs are essential aspects of modern efforts aimed at generating cheaper wind energy, reducing energy consumption in existing technologies, promoting new energy-lean technologies of the future and enhancing safety. Yet, some studies point out the difficulties involved in the accurate simulation of rotor wakes using current systems. For example, J. Krispin, "Extension of the Vorcat Technology to Moving Boundaries," Final Report on DOE Project DE-SC0007573, 2012, which is incorporated by reference herein in its entirety, describes various approximations used by current CFD simulation systems to model the turbulent field in the rotor plane. In addition, J. Krispin, "Development of Vorcat for Cloud Based Simulations," Final Report on NSF grant 1345444, 2014, which is incorporated by reference herein in its entirety, highlights how these issues arise in systems that simulate the flow over two wind turbines placed one behind the other, where several models are used with different approximations and compared. The article further notes the added complexity in trying to simulate flow over a larger number of wind turbines. In the latter case the rotor model may be simplified and the flow downstream does not interact with the flow conditions in the rotor plane in real time.

Another industry that is impacted by the problems in CFD simulation is vertical virtual takeoff and landing (VTOL) vehicles, such as helicopters and drones. VTOL flows are highly turbulent and complex due to, for example, the high rotation speed of the rotor or rotors and fuselage and wing geometries that vary, sometimes in real time (e.g., folding wings or folding partial wings such as the Transwing concept of J. Krispin, "Rotor-Airwake Aerodynamic Coupling in Real-Time Simulation," Final Report on NAVAIR contract N68335-11-C-0083, 2011). The VTOL flow turbulence and complexity raises several concerns, including, for example: (1) rotating flow vortex dynamics; (2) wake interactions with objects in proximity to the VTOL; (3) stall during rotation that causes drop in rotor thrust, as discussed in J.Krispin, "Analysis of Active Flow Control Concepts Using the 3D LES Vorcat Software," Final Report on NASA grant NNX16CL45P, 2016, which is incorporated by reference herein in its entirety; (4) interactions between trailing vortices and lifting surfaces, as discussed in C. a. B. C. Bogey, "Decrease of the effective Reynolds number with eddy-viscosity subgrid-scale modeling," AIAA J., vol. 43, pp. 437-439, 2005, which is incorporated by reference herein in its entirety; (5) dynamic stall about lifting surfaces due to pitching motion, as discussed in P. Moin, "Numerical and physical issues in large eddy," JSME Int. J. B-Fluid, vol. 41, pp. 454-463, 1998, which is incorporated by reference herein in its entirety; and (6) noise propagation prediction, both near field (passenger comfort) and far field (noise pollution), as discussed in P. Moin, "Numerical issues in large eddy simulation of complex turbulent flows and application to aeroacoustics," in Advanced Turbulent, New York, Springer-Wien, 2000, pp. 131-154, which is incorporated by reference herein in its entirety.

Having reliable and accurate simulation data may be critical in any VTOL design system to address these concerns. It is generally not practicable to conduct comprehensive tests on VTOL vehicles in a wind tunnel because, for example, re-producing all flight scenarios in a wind tunnel may be time-consuming, expensive and/or even impossible. As such, the use of CFD simulations in testing VTOL designs is critically important.

In addition, electric VTOL (eVTOL) vehicles are being considered to carry passengers in urban environments, with an investment to date estimated at over $2B and over 250 concepts in various stages of development. https://evtol.com/. The expected proliferation of VTOLs requires accurate flow simulations (and flight simulators based on them) to ensure safe designs and public confidence. VTOLs may be either manned or unmanned (e.g., drones), and both pose flight safety concerns.

Current methods and systems of VTOL design may require parametric analyses, but high-fidelity simulations may require thousands of design parameters. As such, high-fidelity simulations for VTOL design may be impractical.

BRIEF DESCRIPTION OF THE DRAWINGS

For a detailed description of various examples, reference will now be made to the accompanying drawings in which.

DETAILED DESCRIPTION

Embodiments described herein are directed to improvements in systems and methods for fluid flow CFD simulation and technologies incorporating those systems and methods.

Figure 1:
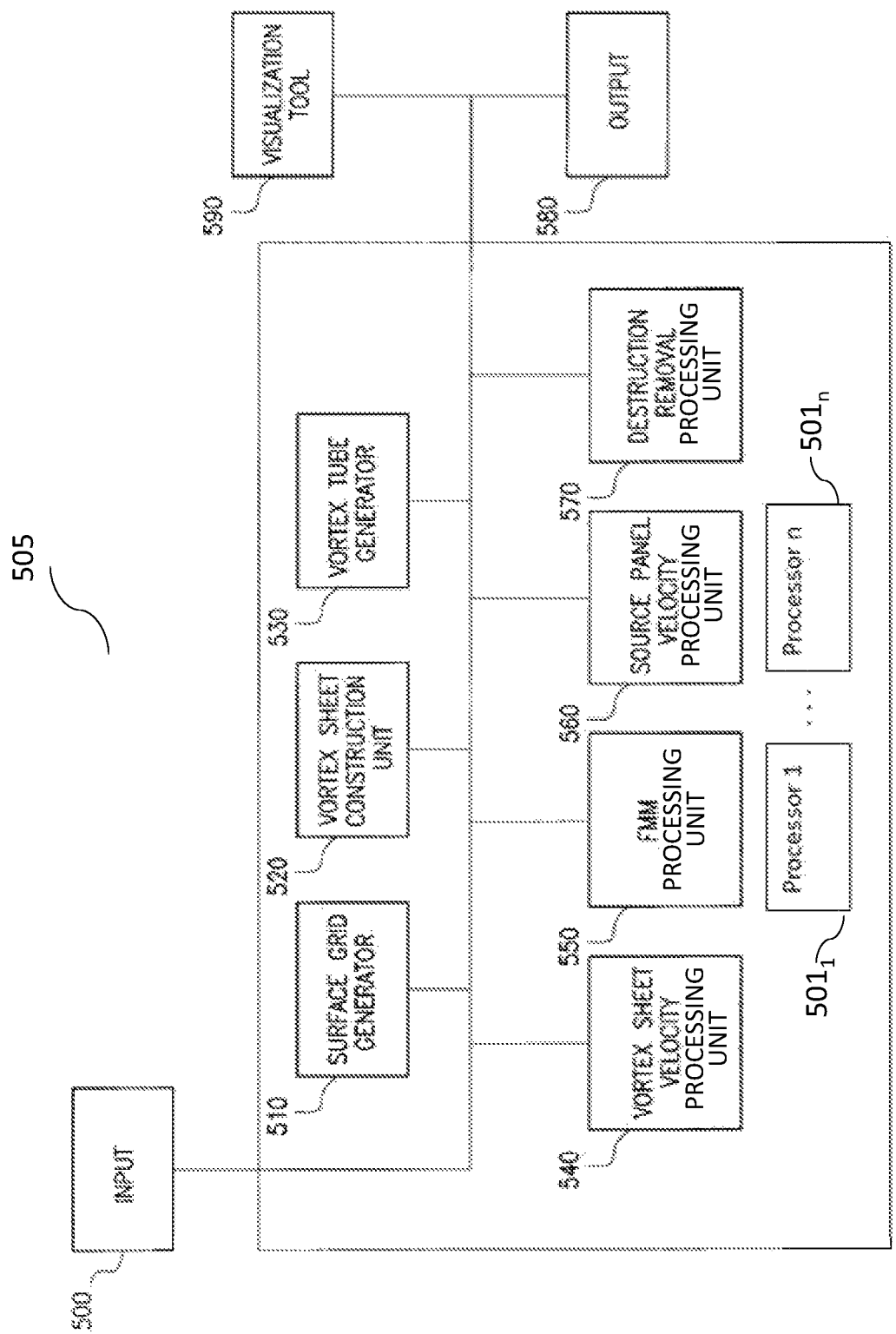
FIG. 1 shows an illustrative CFD simulation system according to embodiments described herein.

FIG. 1 shows an illustrative CFD simulation system 505 for performing embodiments of the inventive CFD simulations described below. CFD simulation system 505 includes input device 500 for entering geometry and parameter input information (e.g., Reynolds number, angle of attack, preferred number of layers in vortex sheet, etc.) for a simulation. The input device 500 may be an input file reader, graphical user interface, keyboard, network interface, disk drive, USB drive, web portal or any other known mechanism for inputting data or information. Among other things, the input information is used by surface grid generator 510 and vortex sheet construction unit 520 to model the geometric shape of the object and develop its prismatic grid.

Vortex tube generator 530 models the vorticity created at the surface of the object and tracks its growth outward through the different vortex sheet layers until it becomes a vortex tube released from the upper vortex sheet layer into the remaining fluid flow. The vortex sheet velocity processing unit 540, FMM processing unit 550 and source panel velocity processing unit 560 operate to compute the velocity and vorticity of field points throughout the flow domain. A filament destruction/removal processing unit 570 is provided to reduce wasteful computations made on vortices not having significant impact on the calculations of the field point velocities, as described below. CFD simulation system has n (one or more) processors 501 which may be used by the CFD simulation system 505 and its various components to perform operations. Output and visualization tools 580, 590, respectively, are provided to facilitate use of the data produced by the CFD simulation in accordance with embodiments described herein. Output 580 may be, for example, a network interface, a disk drive (e.g., USB drive), screen, web portal or any other means of outputting resulting data. Visualization tool 590 may be, for example, the visualization tool described in the '999 Patent.

It should be readily understood that the components depicted in FIG. 1 may be fully or partially combined into one or more different processing units, except as limited by specific hardware configurations described herein. The CFD simulation system 505 described herein may be centrally located, or remotely distributed over a network of processing units (e.g., in a high-performance computing architecture). The functionality of each component or processing unit may be implemented separately or in various component combinations in one or more physical machines executing specific computer software or algorithms. Some or all of CFD simulation system 505 may exist on and remotely accessible (e.g., using a browser) via a cloud or the cloud.

The CFD simulation system 505 is merely representative of the systems described herein, and others, which may benefit from embodiments described herein. For example, the CFD simulation system 505 may be part of an automobile design system used to analyze external aerodynamics of drag forces, noise generation, cross wind stability, etc., during development of new automotive shapes. Alternatively, the CFD simulation system 505 may be part of a wind turbine design system used to analyze the turbulent field in a rotor plane. In addition, the CFD simulation system 505 may be part of a wind turbine farm design system used to optimize the layout of the wind turbine farm. The CFD simulation system 505 may also be part of a VTOL design system used to design VTOLs and test those designs.

Figure 2:
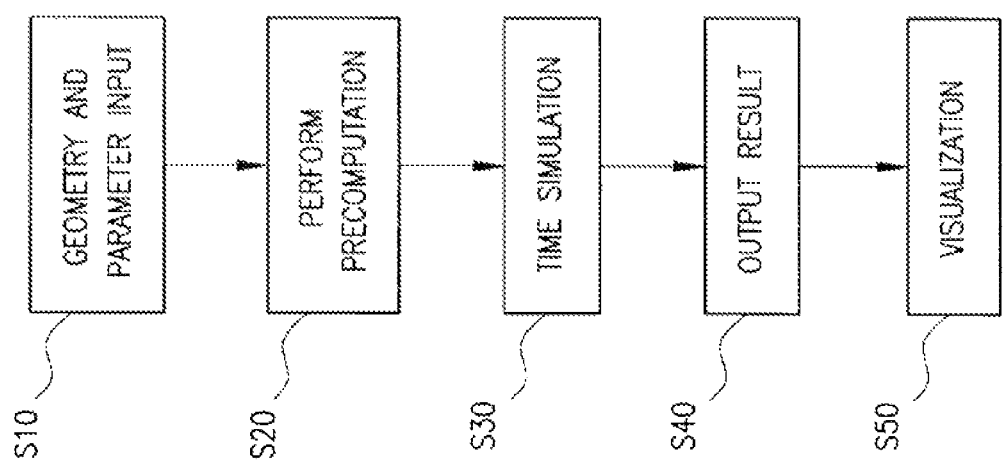
FIG. 2 shows an illustrative CFD simulation method implemented by a CFD simulation system, according to embodiments described herein.

FIG. 2 shows a CFD simulation method implemented by a CFD simulation system (e.g., CFD simulation system 590) to implement embodiments of the invention described herein involving simulation of fluid flow interaction with an object or objects. The CFD simulation method is initiated at step S10 by the input at input 500 (FIG. 1) of a set of parameters indicative of the physical process to be evaluated. As will be described above below, the parameters may address, for example, the number of vortex sheet layers defined over the surfaces of the object, the number of field points within a subdomain associated with a velocity, whether the object is moving and at what speed/rotation and rotation axis with respect to the static/global frame of reference, and other data directed to the resolution, efficiency, complexity and other criteria of the computation or flow environment needed to evaluate the CFD.

Step S10 preferably includes the process of modeling or defining the geometry of all the solid surfaces of the object. In accordance with a preferred embodiment of the invention, the object's geometry is defined as a surface grid or mesh of space-filling shapes. The space-filling shapes may all be the same shape, or may be one or more different shapes. In one embodiment, the space-filling shape is a triangle, and the grid is comprised of a plurality of triangular elements to represent the solid surfaces in three-dimensions. After the surface mesh is generated, one or more refining or improving steps may be added to increase the accuracy of the surface mesh. These refining or improving steps may involve using smaller shapes at edges.

Figure 3:
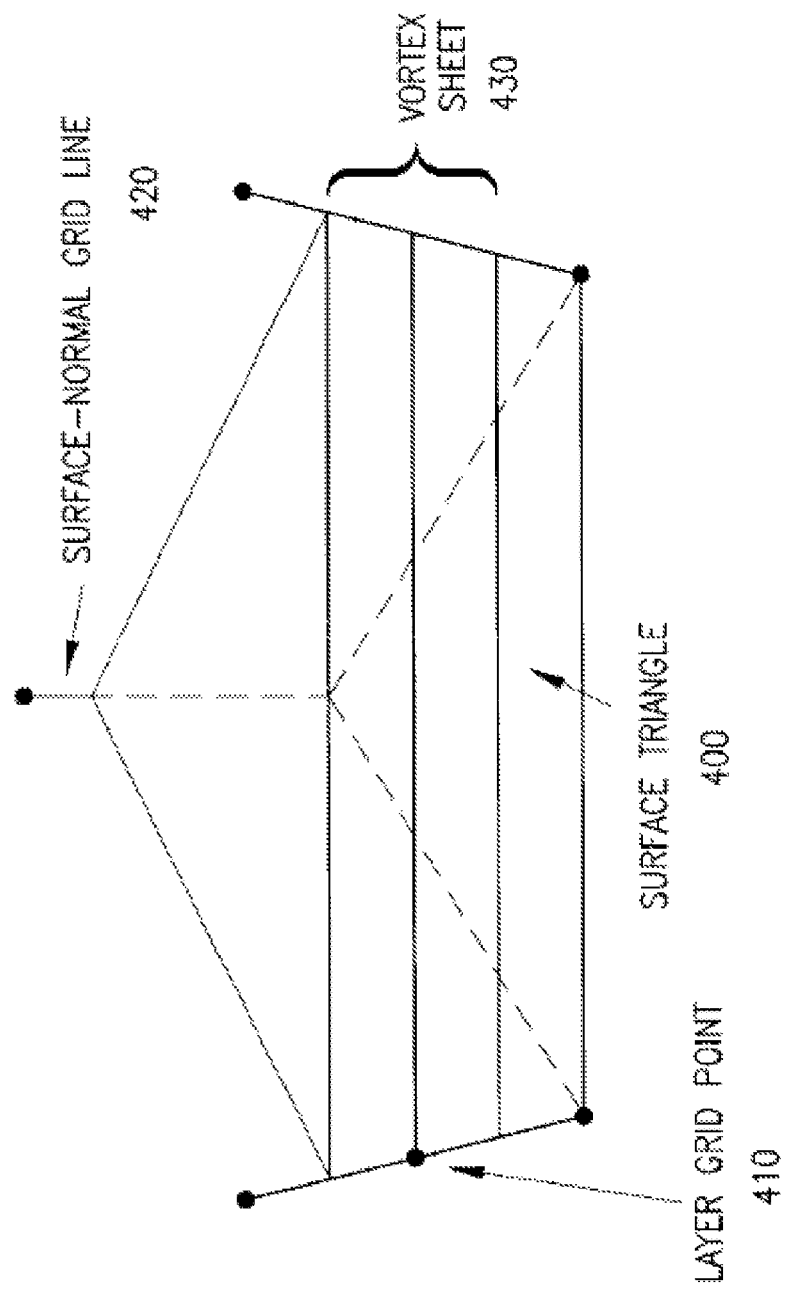
FIG. 3 illustrates a plurality of vortex sheet layers defined above the surface of an object, according to embodiments described herein.

In one embodiment, the flow near the boundary or wall of the object is modeled with a series of vortex sheets. The vortex sheets may be organized by two (or any other number of) fluid layers. As shown in FIG. 3, a layer grid of the vortex sheets 430 may be constructed by taking the wall-normal lines 420 at the vertices of the surface triangular elements 400, defining the grid points 410 on these lines, and connecting them so as to generate a prismatic grid.

In one embodiment, the layers of vortex sheets are of finite thickness around the boundary of the object. The precise thickness and the exact number of layers used may be input in step S10, and may be dependent on the complexity of the object under study or with the desired level (or order) of accuracy of the computation. For example, when used in the design of an automobile, the input may specify 10 layers making up the vortex sheet with a total thickness of 1% of the total length of the automobile. Preferably, the layers are of uniform thickness. (In the alternative, the thickness of the layers may be varied.) In any event, the layers remain fixed overlaying the surfaces of the object.

Once the geometry and parameter inputs are made in step S10, the process flow proceeds to step S20 (FIG. 1) where initial computations are made by CFD simulation system 505, for example based on the parameters input at step S10, and any dump or restart files from prior executions of the same simulation, before the simulation begins at step S30. This method of FIG. 2 applies to new simulations and restart simulations.

Figure 4:
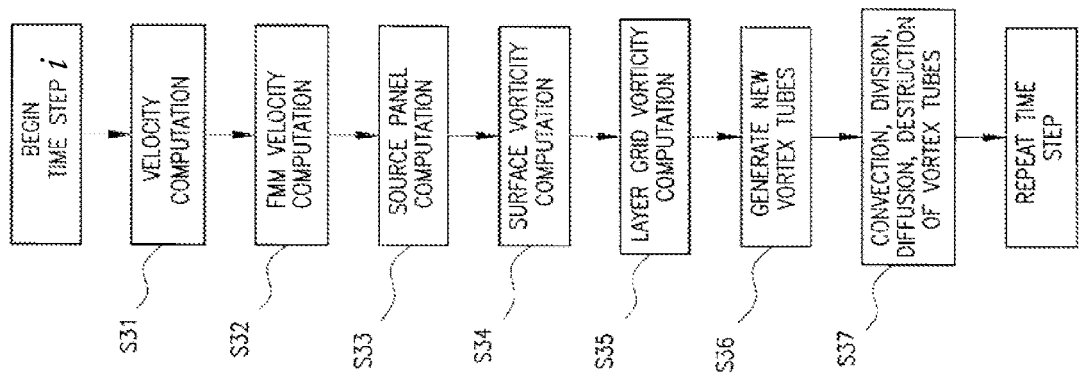
FIG. 4 shows an illustrative method for performing the time simulation step of FIG. 2, according to embodiments described herein.

The time simulation step S30 represents a plurality of time segments or steps performed by CFD simulation system 505 that capture the change in fluid flow characteristics over time. During each time step, CFD simulation system 505 performs a sequence of events or sub-steps (S31-S37), as shown in FIG. 4. In one embodiment, the time steps simulate the creation of vorticity at the surface of the object, the outgrowth of the vorticity through the vortex sheet layers, and the release or ejection of the vortices from the outer sheet layers into the rest of the flow domain. The origin of turbulence and vorticity, i.e., the instantaneous rotation of the fluid motion, occurs at the boundary or surface wall of the object. The flow and the creation of new vorticity at the boundary may be mimicked by stringing together the vortex sheets. A detailed discussion of embodiments of the process flow in sub-steps S31 through S37 is described below with reference to FIG. 4 and other figures.

After the time simulation step S30, CFD simulation system 505 may output to output 580 the resulting data produced by the process flow in step S40. Typical outputs resulting from the process flow include data on the strength of vortex sheets, strength and location of vortex filaments, etc. The resulting data can also be visualized in step S50 using a visualization tool 590 (FIG. 1).

FIG. 4 shows the time simulation step S30 divided into sub-steps S31 through S37. The full sequence of sub-steps S31-S37 is performed at each time step or segment i of time steps 1 . . . n in the CFD simulation method of FIG. 2, as described above. At step S31, vortex sheet velocity processing unit 540 (FIG. 1) computes the velocity induced on every field point by every vortex element whose vorticity strength was computed from the previous time step. At step S32, FMM processing unit 550 uses FMM to compute velocity, which is based on combining the velocity fields induced by collections of nearby vortices into a single local expansion, preferably, in spherical harmonics. At step S33, source panel velocity processing unit 560 creates the surface source panels. At step S34, the source panel velocity processing unit 560 (FIG. 1) computes the surface vorticity on the first surface layer of the grid. At step S35, the source panel velocity processing unit 560 (FIG. 1) computes the layer grid vorticity on the remaining layers. At step S36, the vortex tube generator 530 (FIG. 1) generates new vortex tubes based on the computations in the previous steps. In step S37, destruction removal processing unit 570 (FIG. 1) convects, divides, diffuses and/or destroys vortex tubes as necessary. Example implementations of steps S31-S37 are described in detail in the '999 Patent, the entirety of which is incorporated by reference herein.

FMM

In some CFD simulations, the velocity computation (e.g., advecting the filaments) may represent 90% or more of the entire simulation, making acceleration of the velocity computation often an effective way to improve CFD simulation speed. The velocity calculation may involve a differential equation for new filament end-points, and higher-order differential equations require multiple velocity calculations at each step which further increases the computational workload. For example, for a 4th order Runge-Kutta solver, four velocity calculations are needed at each global step. Additionally, if the model contains an object or objects obstructing the flow, each velocity calculation must not only account for the velocity induced by the filaments, it also must account for the velocity induced by the vortex sheets on the object surface grids and for the potential flow velocity that accounts for the no-penetration boundary condition on all surfaces. Accelerating and scaling these velocity calculations allows for the use of more-accurate CFD simulations, and therefore allows for better technology based on those simulations, for example automobile design or wind turbine/turbine farm design.

As described above, the velocity computations utilizing FMM are carried out in sub-step S32 (FIG. 4), which generally combines the velocity fields from step S31 induced by collections of nearby vortices into a single local expansion using spherical harmonics. By shifting the center of the expansion to the neighborhood of other collections of vortices, an efficient velocity field calculation can be affected.

Figure 5:
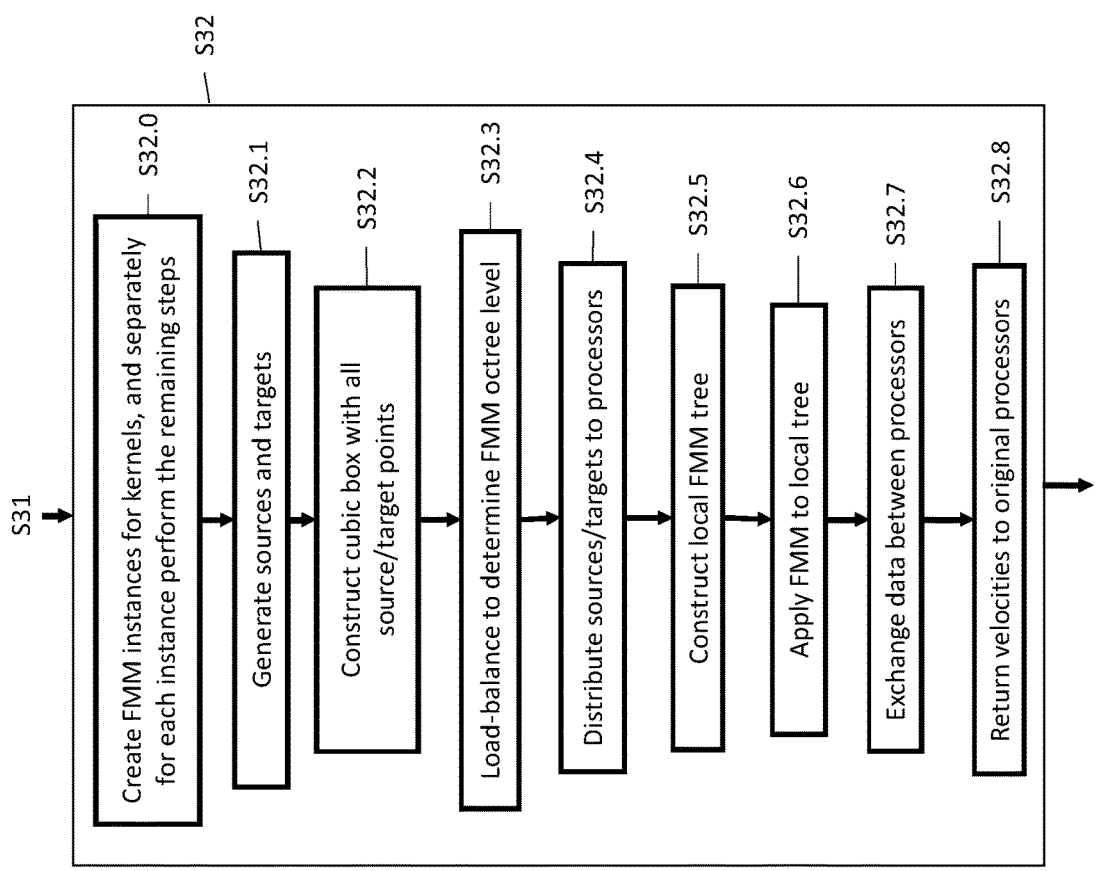
FIG. 5 shows an illustrative method of performing FMM, according to embodiments described herein.

FIG. 5 shows a method of performing FMM which may allow memory resources to scale. The method of FIG. 5 may distribute data to the processors so that, for example, each processor holds a disjoint subset of all sources and targets. The method of FIG. 5 is at least a portion of the implementation of step S32 of FIG. 4.

At step S32.0, the FMM processing unit 550 creates three separate instances of an FMM to respectively interface with each of three kernels: a tube kernel, a sheet kernel and a panel kernel. The tube kernel handles sources as vortex tubes, the sheet kernel handles sources as vortex sheets and the panel kernel handles sources as surface panels. Each of the three FMM instances then performs the remaining steps in FIG. 5 (S32.1-S32.8) separately for its respective source type At step At step S32.1, the FMM processing unit 550 generates an array of source points and their strengths, and an array of target points where the velocities are to be computed. While the sources and their strengths and velocity computations differ, as described in the '999 Patent, the FMM processing unit 550 is configured to handle these differences and process each instance based on the source type. For velocity due to the filaments, the source points are the centers of the tubes and their strengths are computed based on the circulation and length of the tubes. The target points, where the velocity is calculated, are the endpoints of the tube, or any other point in the domain where the velocity due to the filaments is desired. The velocity at the end points of the tubes are needed for the advection routine in step 337 (FIG. 4) that determines the movement of the tubes from time step to time step. Other targets include points on the grid where the velocity is needed by vortex sheet velocity processing unit 540 and source panel velocity processing unit 560, and any points of interest within the flow domain as specified by the user—that is, points not needed by the method but requested for output. For velocity due to the vortex sheets, the source points are the centers of the triangles representing the sheets and their strengths are the associated vorticity computed by vortex sheet velocity processing unit 540. In general, FMM processing unit 550 does not require a grid structure; however, when FMM processing unit 550 is called in this case the near field velocities are evaluated by integrals over the triangular sheets so pointers to the structure of these triangles are passed as part of the array of sources. The target points may be determined in the same manner as when the sources are tubes (e.g., the endpoints of the tube), but in this case the contribution is due to the vortex sheets. For velocity contribution due to the source panels, the source points are the surface triangle centers and their strengths are as computed in source panel velocity processing unit 560. The target may be determined in the same manner as when the sources are vortex tubes, but in this case the contribution is due to the source panels (or potential flow).

At step S32.2, FMM processing unit 550 constructs a cubic box such that all source and target points are contained within it. As such, the size of the FMM nodes at the lowest level are equal to the equilibrium radius (as described in the '999 Patent) and the depth of the FMM octree is limited by this equilibrium radius. This cubic box may represent the root (or top) level node of the FMM octree. Subsequent levels are obtained by subdividing the sides, as described in detail in the '999 Patent. At step 332.3, FMM processing unit 550 performs a load-balancing function, as described in detail hi the '999 Patent, to determine the level of the FMM octree used for distributing the workload across processors and an optimal distribution of the sources and targets at the load-balance level. At step S32.4, FMM processing unit 550 distributes the sources and targets to the processors $501_1$-$501_n$ based on the result of the load-balancing in step S32.3. At step 32.5, each processor $501_1$-$501_n$ constructs a local FMM octree based on the local set of sources and targets at the respective processor $501_1$-$501_n$. The levels above the load-balancing level in each local FMM octree may be identical on all processors, thereby creating common FMM nodes on each local FMM octree.

At step S32.6, the respective processor $501_1$-$591_n$ performs the FMM process, for example the FMM process described in the '999 Patent, for each local FMM octree to determine the velocity contribution of the local sources on the local targets. At step S32.7 and S32.8, appropriate remote sources and remote multipole expansions are exchanged and applied to the local targets so that the velocity at each local target point contains the contribution from all global sources. The majority of these contributions may be in the form of multipole expansions that account for distant sources. The common FMM nodes are used to collect the remote multipole expansions at the nodes above the load-balance level. Remote sources in close proximity to the local octree may be exchanged to account for their near-field influence. At step S32.8, each processor $501_1$-$501_n$ provides the target point velocities calculated in step S32.7 to the processor associated with the respective target.

The FMM kernels, described above, for the source and target points result from vortex filaments, vortex sheets and surface panels, each computes the multipole expansions for the far-field velocity contribution and each computes the near-field velocities using the exact formulas for the point-to-point (P2P) evaluation of the velocity contribution.

ExaFMM is an open-source FMM implementation that take advantage of many aspects of HPC hardware. ExaFMM, however, has no appropriate kernel for the sheet and potential velocity P2P calculations that use the exact integral formulation. Moreover, ExaFMM is designed primarily for uniformly distributed data and cannot, therefore, handle data that is not uniformly distributed. Additionally, ExaFMM does not handle the tree depth limitation imposed by the equilibrium radius, as described in the '999 Patent, which can lead to non-physical velocities. Embodiments of the method of FIG. 5 described above, however, do not have these limitations.

The method of FIG. 5 may be implemented using a hybrid shared memory. For example, the method of FIG. 5 may be implemented using OpenMP, an API used for shared memory programming, and/or the message passing interface (MPI), which is a message-passing standard designed to function on parallel computing architectures.

Figure 6:
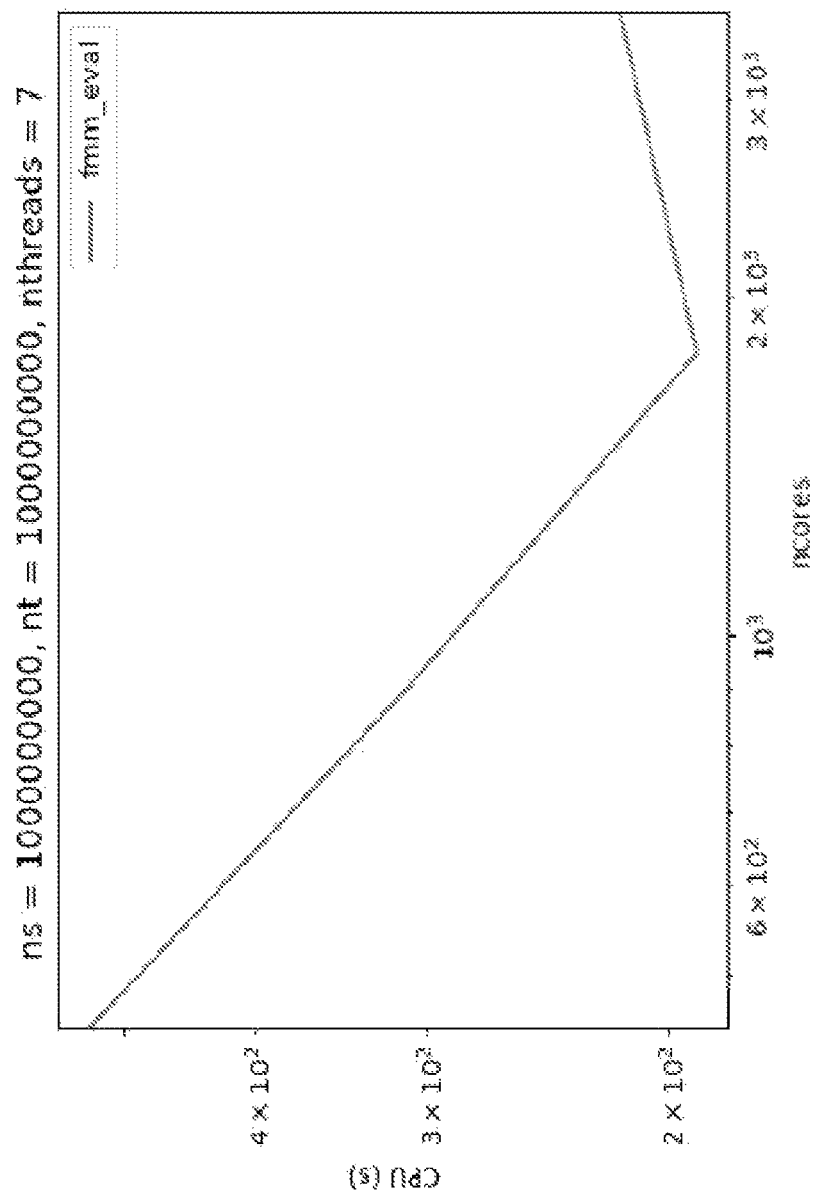
FIG. 6 shows the performance of embodiments of systems and methods described herein.

FIG. 6 shows the results of a CFD simulation using the method of FIG. 5 with an exemplary hybrid shared memory. The simulation included 1 billion source points and 1 billion target points. The simulation was performed on an HPC system with 2 Intel Haswell (E5-2695 v3) CPUs per node and 14 cores/CPU with 128 GB of memory per node. The simulation utilized 8 through 128 nodes or 224 through 3,584 CPU cores. Each run of the simulation was configured with 4 MPI processes per node and 7 OpenMP threads per MPI process. The data shows scalability up to about 2,000 cores.

Figure 7:
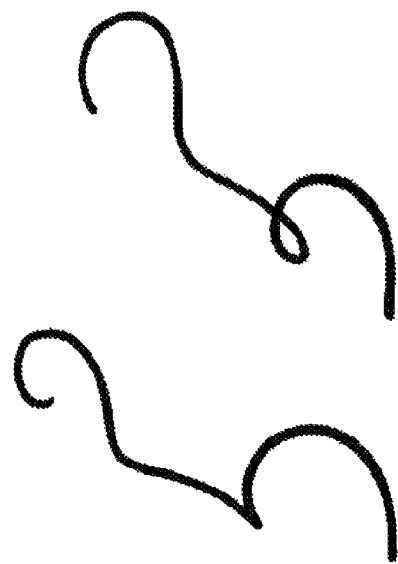
FIGS. 7-9 show two illustrative filaments.
Figure 8:
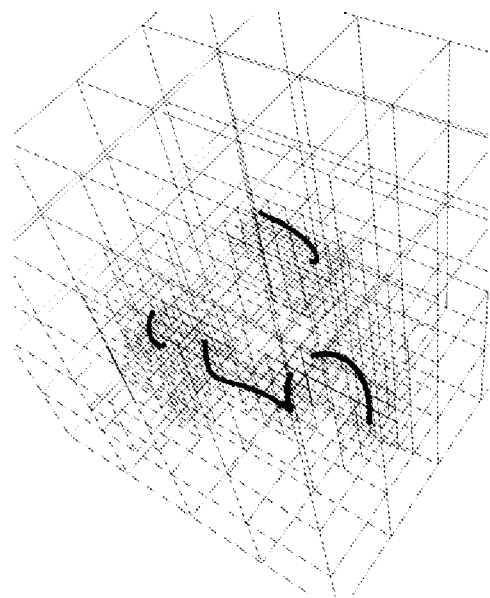
Figure 9:
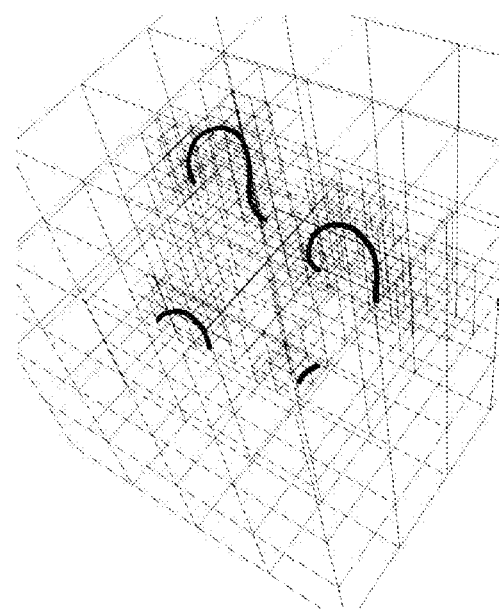

FIG. 7 shows an example of 2 filaments where the entirety of each filament lives on a single processor. FIGS. 8 and 9 show same two filaments placed within the local FMM octree generated by their respective processor. FIG. 3 shows the portions of the filaments that reside on a first processor, and FIG. 4 shows the portions of the filaments that reside on a second processor, after each are distributed as source and target points as required by method of FIG. 5. Any mismatch is mitigated by moving filaments to the processor where the preponderance of tubes was processed on the previous call to the FMM.

At exascale, the number of compute cores and nodes utilized in a simulation may be very large, making it important to minimize inter-node communication while also minimizing idle core time. Step S32.7 of the FMM method of FIG. 5 requires exchanging multipole expansions and near-field sources at processor boundaries, and the boundaries are typically larger in terms of the size of the data. With large models (e.g., hurricanes), exchanging sources may be costly, particularly if the maximum FMM tree depth has been reached and the number of sources in an FMM node exceeds the critical amount.

To reduce the resulting communication costs, step S23.7 is modified so that each local FMM tree node holding sources that are needed by other processors constructs a local model representing these sources, and exchanges the model parameters instead of the sources themselves. The local models may be functions that return estimate of the velocity contribution due to the remote sources. For example, the local models may be simple interpolation models, or more complex statistical and machine learning models. One simple model is tri-linear interpolation. If processor m contains an FMM node, $N_m$, with near-field sources that need to be applied to node $N_n$ on processor n, then processor m computes the influences of all sources in node $N_m$ on the corners of a box representing node $N_n$. To apply these influences to node $N_n$ on processor n, only the tri-linear interpolation coefficients are exchanged instead of all the sources. This significantly reduces the amount of inter-node communication needed.

Loop Removal

Figure 11:
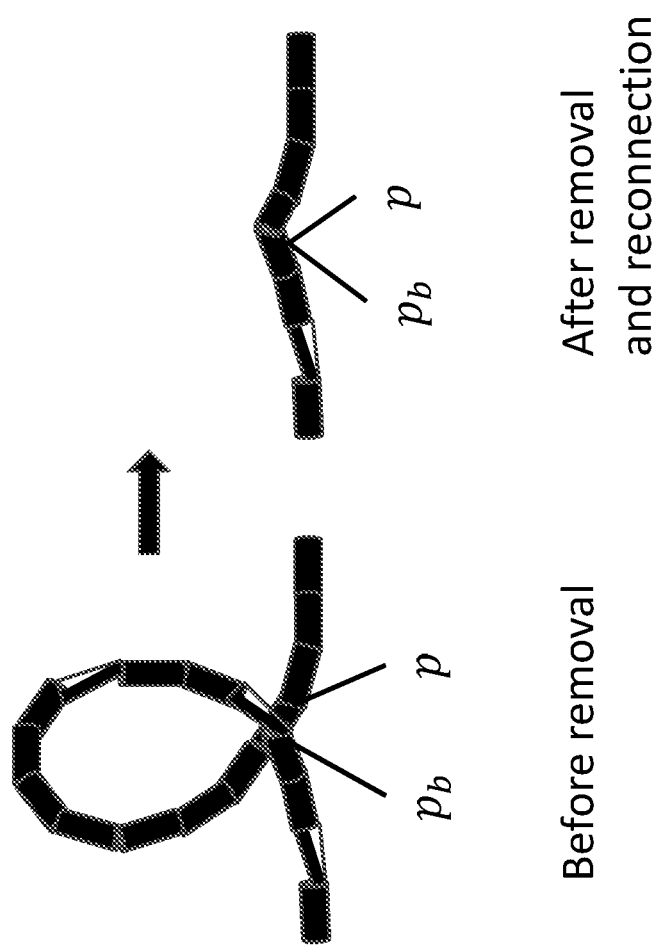
FIG. 11 shows an example of the loop removal performed by the method of FIG. 10.

As vortex filaments evolve in a CFD simulation, the filaments may bend and fold in response to the velocity field, thereby creating small-scale flow structures. Such small-scale flow structures may be unwanted and therefore unnecessarily consume system resources and delay the modeling process. When one of these small-scale structures results from a filament folding on itself, the small-scale structure may be induced by a vortex filament loop, as shown in FIG. 11. The far field contribution of these loops is essentially zero, but the near field impact is generally not necessary to resolve.

Figure 10:
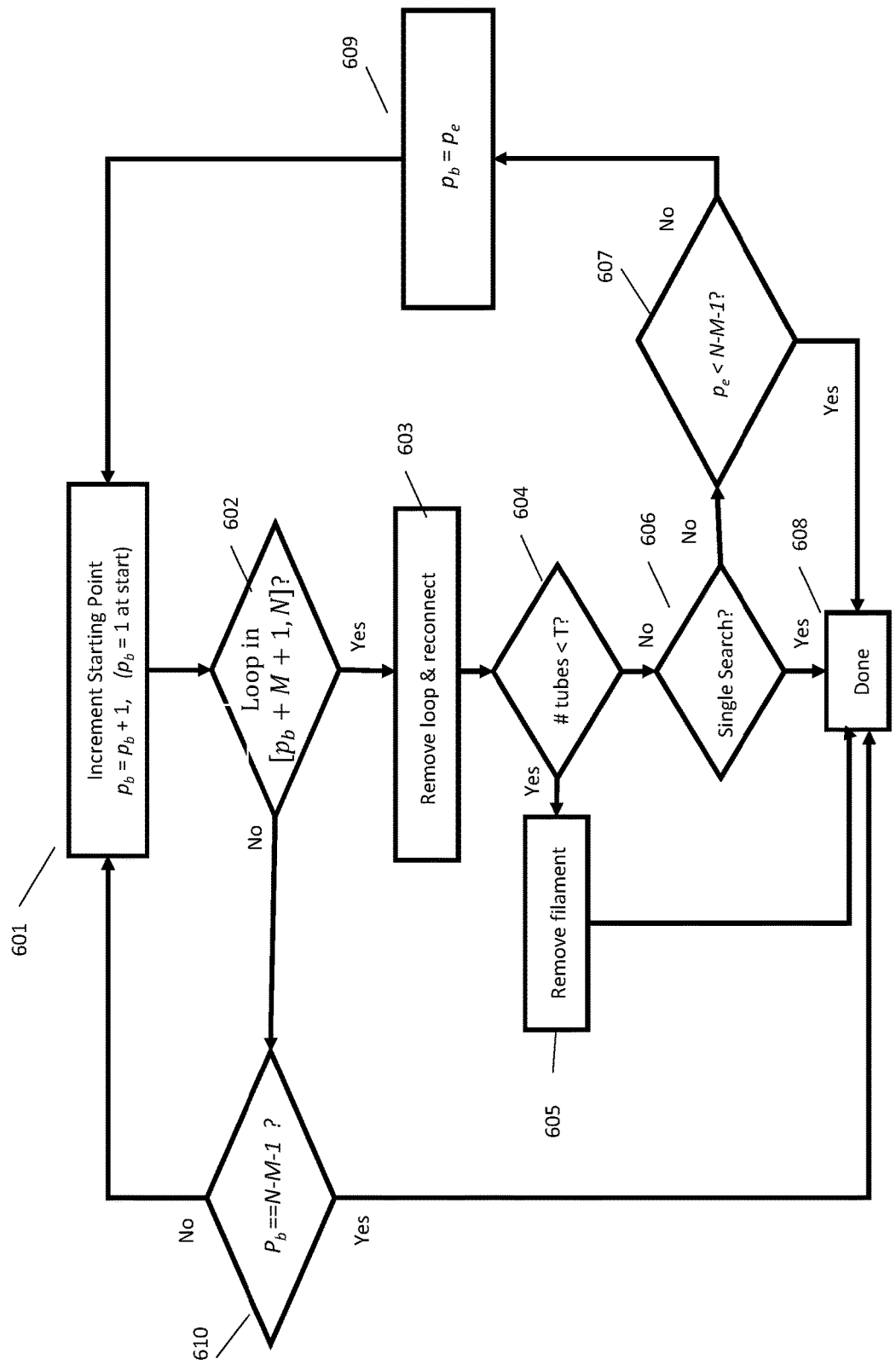
FIG. 10 shows an illustrative method for loop removal.

FIG. 10 shows an illustrative method of removing such loop structures. The method of FIG. 10 may be performed for each filament. At step 601, the destruction removal processing unit 570 sets the beginning endpoint $p_b$ to 1 for the first iteration of the method on a filament, or increments beginning endpoint $p_b$ for subsequent iterations. The starting endpoint $p_b$ represents the beginning of a portion of filament to be searched for a loop. At step 602, the destruction removal processing unit 570 searches for an ending endpoint $p_e$ meeting certain criteria demonstrating that it is the end of a loop defined by the points in the interval $[p_b, p_e]$. The search for $p_e$ begins M tubes from $p_b$, enforcing the requirement that a filament must have at least M tubes before it is removed. M may be any value, and may be entered in step S10, or may be pre-set or hard coded. In addition, a default value for M may be provided. The portion of the filament searched for the ending endpoint $p_e$ is $p_e \in [p_b+M+1, N]$, where N is the total number of endpoints in the filament. Any criteria can be used to determine if a loop is present. For example, the destruction removal processing unit 570 may determine that a loop is present if the distance between $p_b$ and $p_e$ on the filament is above a threshold. Alternatively, the destruction removal processing unit 570 may determine that a loop is present if the distance between $p_b$ and $p_e$ is a factor of a radius of an ideal circular loop, which may be input at step S10 (FIG. 2).

If no loops are found, at step 610 destruction removal processing unit 570 determines if $p_b=N-M-1$. If so, the method proceeds to step 608 and is complete. If not, the method returns to step 601 where the beginning endpoint $p_b$ is incremented by 1. If a loop is found, at step 603 the loop is removed. Removing the loop results in two disconnected filament ends, one with endpoint $p_b$ and the other with endpoint $p_e$. The filament may then be reconnected by, for example, constructing a tube between these two points or by setting both endpoints equal to their average.

At step 604, the destruction removal processing unit 570 determines if the number of tubes remaining in the filament is below a threshold T, and if so, removes the filament from the model. Threshold T may be set at step S10 (FIG. 2), though a default value may be provided. The method is complete at least for that filament at step 608. If the number of tubes remaining in the filament is not below a threshold, at step 605, the destruction removal processing unit 570 determines if only a single loop is to be removed from each filament, and if so, the method proceeds to step 608 and is complete. If not, at step 607, the destruction removal processing unit 570 determines if sufficient tubes remain in the filament to check for another loop. If not, the method proceeds to step 608 and is complete. If there are a sufficient number of tubes remaining, at step 609, the destruction removal processing unit 570 sets the starting point $p_b$ equal to the end point of the loop just found and the method proceeds back to step 601 where the beginning endpoint $p_b$ is incremented by 1 and the steps are repeated.

All filaments are subjected to the loop-removal process of FIG. 10 during step S37 (FIG. 4) at each timestep. The loop removal method of FIG. 10 removes unwanted small-scale structures and testing has been shown to be more effective than prior methods in controlling the explosive growth of the tubes while maintaining the ability to accurately capture turbulence.

Moving Boundaries

Figure 12:
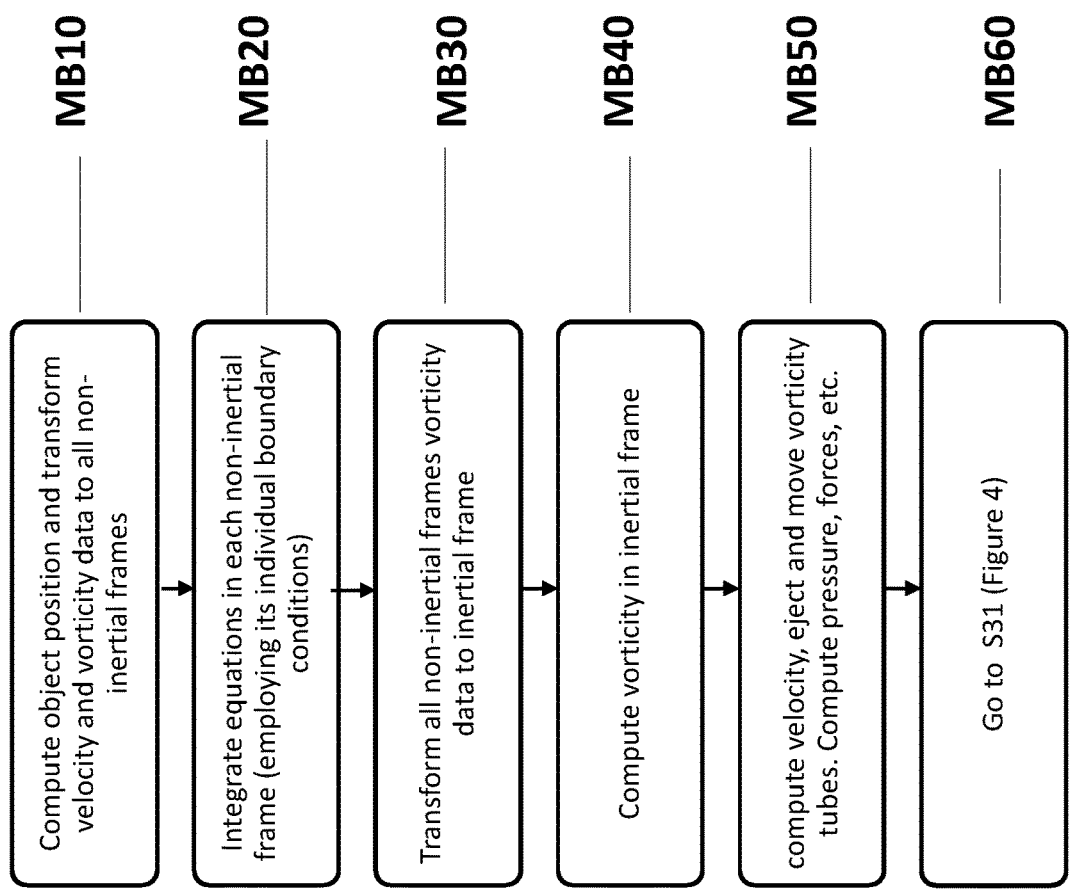
FIG. 12 shows an illustrative method for modeling fluid flow in relation to a moving object.

As described above, current CFD simulation systems, for example those used for the design of rotor blades, the controllability of rotating wings (e.g., eVTOL vehicles), maneuvering submarine, etc., are generally unable to efficiently and accurately model a flow in relation to these moving objects. FIG. 12 shows a method for modeling addressing such moving boundaries that may be performed by a CFD simulation system, for example CFD simulation system 505 (FIG. 1). The method in FIG. 12 may be performed for each moving object at each time frame. The method in FIG. 12 may be performed before, during or after step S31, but before step S32 of FIG. 4. At step MB10, vortex sheet velocity processing unit 540 of the CFD simulation system 505 computes the position of a moving object and transforms the velocity and vorticity data to all non-inertial frames. The position vector of the moving object in the non-inertial frame, $\bar{r}|_B$, is computed using:

$$\bar{r}|_B = \mathcal{R} \cdot \bar{r}$$

where $\bar{r}$ is the position vector of the moving object in the inertial frame and $\mathcal{R}$ is a time dependent rotation matrix constructed by multiplying the rotation $\mathcal{R}$ matrices about each coordinate. The rotation matrix and its inverse are used for the transformations of velocity and vorticity as follows:

$$\mathcal{R}_x(\alpha) = \begin{pmatrix} 1 & 0 & 0 \\ 0 & \cos(\alpha) & -\sin(\alpha) \\ 0 & \sin(\alpha) & \cos(\alpha) \end{pmatrix}$$

$$\mathcal{R}_y(\beta) = \begin{pmatrix} \cos(\beta) & 0 & \sin(\beta) \\ 0 & 1 & 0 \\ -\sin(\beta) & 0 & \cos(\beta) \end{pmatrix}$$

$$\mathcal{R}_z(\gamma) = \begin{pmatrix} \cos(\gamma) & -\sin(\gamma) & 0 \\ \sin(\gamma) & \cos(\gamma) & 0 \\ 0 & 0 & 1 \end{pmatrix}$$

so that the orthogonal rotation matrix $\mathcal{R} = \mathcal{R}_x \mathcal{R}_y \mathcal{R}_z$ about x, y, and z, is given by, $$\mathcal{R} = \begin{pmatrix} \cos(\beta)\cos(\gamma) & \cos(\beta)\sin(\gamma) & -\sin(\beta) \\ \sin(\alpha)\sin(\beta)\cos(\gamma) - \cos(\alpha)\sin(\gamma) & \sin(\alpha)\sin(\beta)\sin(\gamma) + \cos(\alpha)\cos(\gamma) & \sin(\alpha)\cos(\beta) \\ \cos(\alpha)\sin(\beta)\cos(\gamma) + \sin(\alpha)\sin(\gamma) & \cos(\alpha)\sin(\beta)\sin(\gamma) - \sin(\alpha)\cos(\gamma) & \cos(\alpha)\cos(\beta) \end{pmatrix}$$

At step MB20, vortex sheet velocity processing unit 540 integrates equations in each non-inertial frame of time by employing the boundary conditions of the object. At step MB30, vortex sheet velocity processing unit 540 transforms all vorticity data for all non-inertial frames, $\overline{\omega}$), to the inertial frame using the following:

$$\mathcal{R}^{-1} = \begin{pmatrix} \cos(\beta)\cos(\gamma) & \sin(\alpha)\sin(\beta)\cos(\gamma) - \cos(\alpha)\sin(\gamma) & \sin(\alpha)\sin(\gamma) + \cos(\alpha)\sin(\beta)\cos(\gamma) \\ \cos(\beta)\sin(\gamma) & \sin(\alpha)\sin(\beta)\sin(\gamma) + \cos(\alpha)\cos(\gamma) & \cos(\alpha)\sin(\beta)\sin(\gamma) - \sin(\alpha)\cos(\gamma) \\ -\sin(\beta) & \sin(\alpha)\cos(\beta) & \cos(\alpha)\cos(\beta) \end{pmatrix}$$

to yield $\overline{\omega}$, and then executing:

$$\overline{W} = \overline{\omega} + 2\overline{\Omega}$$

where $\overline{W}$ is the absolute vorticity in the inertial frame and $\overline{\Omega}$ is the angular velocity of the non-inertial frame.

At step MB40, vortex sheet velocity processing unit 540 computes a vorticity field for the moving and non-moving objects in the inertial frame. At step MB50, vortex sheet velocity processing unit 540 integrates equations in the inertial frame and computes velocity and vorticity in the inertial frame, and releases, advects, ejects and removes vorticity tubes. Step MB50 may also involve vortex sheet velocity processing unit 540 may also computing pressure, forces and other post-processing parameters. At step MB60, the CFD simulation continues to step S31 in FIG. 4. If step S31 is complete, the CFD simulation may instead continue to step S32.

Conventional CFD systems modeled moving boundaries by using moving and deforming grid techniques, which may have resulted in severe mesh distortions due to the inability of those systems to model objects that were too close or the motion of irregular objects. As described in J. P. Collins and P. S. Bernard, "A gridfree scheme for simulation of natural convection in three dimensions," Journal of Computational Physics, p. 209-224, 2018, which is incorporated by reference herein in its entirety, some systems used fixed-mesh approaches for moving bodies in order to address these problems, but with fixed-meshes the continuity equation must be altered to account for the motion of the body in the fixed mesh, which introduces additional difficulty because the term added to the continuity equation (and other conservation equations in some cases) is sometimes hard to define and involves ad-hoc modeling. Moreover, these fixed-meshes were fixed in space, and not to the moving body.

The method of FIG. 12 does not have these limitations or problems. No remeshing is required and multiple moving objects may be modeled, each of which may be following a different motion. As such, the possibility of severe mesh distortions is reduced. In addition, the Navier-Stokes equations in their vorticity form employed by this apparatus allow for decoupling the various surface grid integrations. In particular, the Eulerian integration on each moving boundary is done in its individual, non-inertial frame of reference and the Lagrangian step is performed in the global, inertial frame of reference after appropriate transformations from the various non-inertial frames.

Due to the improvements described above, moving objects may be more reliably, efficiently and accurately modeled in fluid flow, minimizing the reliance on assumptions, and without the need for ad-hoc modeling. These improvements, for example, provide for more accurate and reliable wind turbine and wind turbine farm simulation systems, VTOL simulation systems and automotive and/or aerospace simulation systems.

Correcting Surface Vorticity Errors

Figure 13:
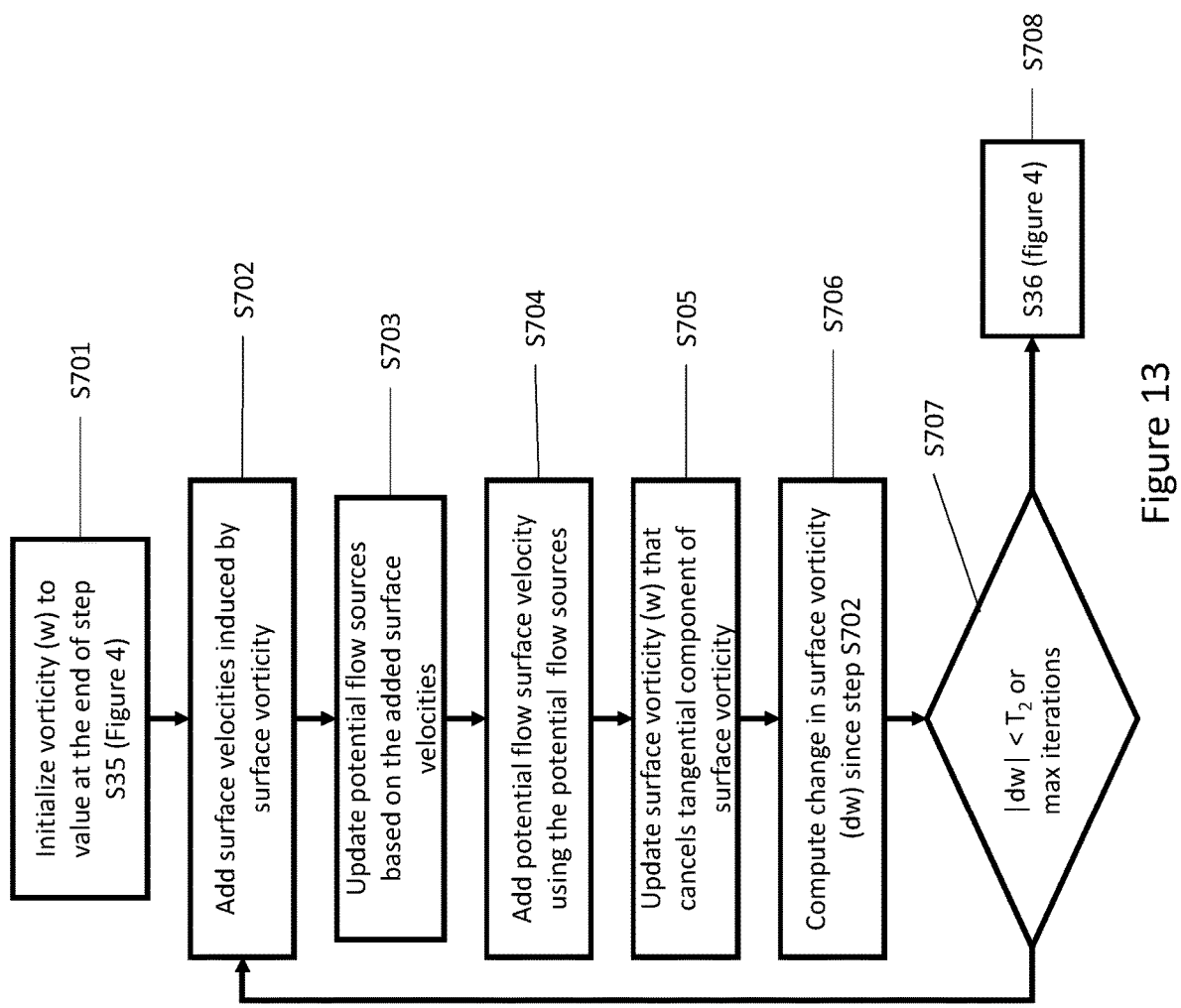
FIG. 13 shows an illustrative method for correcting errors in surface vo ticity.

FIG. 13 shows a method for CFD simulation system 505 to correct errors in surface vorticity that may exist at the end of step S35. The method of FIG. 13 may be performed by vortex sheet construction unit 520. Such errors may occur where step S35 involves enforcing a zero-vorticity boundary condition on a solid surface by placing a (virtual) half sheet (i.e., the surface vorticity layer) with the opposite vorticity on the opposite side of the solid surface. For a flat surface or slightly curved surface, the vorticity on neighboring half sheets may produce zero or very small vorticity on the surface, respectively. Half sheets for geometries with sharp corners and/or highly curved surfaces, however, induce non-zero vorticity on their neighboring half sheet, and a no-slip boundary condition is not satisfied. The method of FIG. 13 allows the CFD simulation system 505 to correct the vorticity magnitude at the half sheet level by iteratively computing a half sheet vorticity that satisfies a no-slip boundary condition.

At step S701, a vorticity value w is initialized to the vorticity value at the end of step S35 (FIG. 4). At step S702, CFD simulation system 505 computes surface velocities induced by surface vorticity (for example as described in FIG. 5) and adds them to the model. At step S703, CFD simulation system 505 updates the surface velocity so that process unit 570 can compute the potential flow sources. At step S704, CFD simulation system 505 adds potential flow surface velocity using the potential flow sources updated in S703. At step S705, the CFD simulation system 505 now has an estimate of the surface tangential velocity, which in turn provides the surface vorticity and it is updated until the iteration in FIG. 13 converges at step S707, as described below. At step S706, the CFD simulation system 505 computes the change dw in surface vorticity w since the beginning of step S702. At step S707, the CFD simulation system 505 determines if the absolute value of the change in surface vorticity (|dw|) is less than a threshold value $T_2$. The CFD simulation system 505 also determines if a max number of iterations of steps S702-S706 has been performed. If |dw|<T, or if the max number of iterations has been reached, the CFD simulation system 505 performs steps S702-S706 again. Otherwise, at step S708 the method is complete and the method of FIG. 4 may continue to step S36.

The method of FIG. 13 may be particularly useful when local, time-dependent, strong turbulent activity is present, for example if the parameters entered as step S10 (FIG. 2) indicate that the model is complex and/or includes sharp corners. The method of FIG. 12 may improve upon, for example, existing automotive design systems and/or wind turbine/turbine farm design systems that model complex turbulence.

Rotor Disk Model

Figure 14:
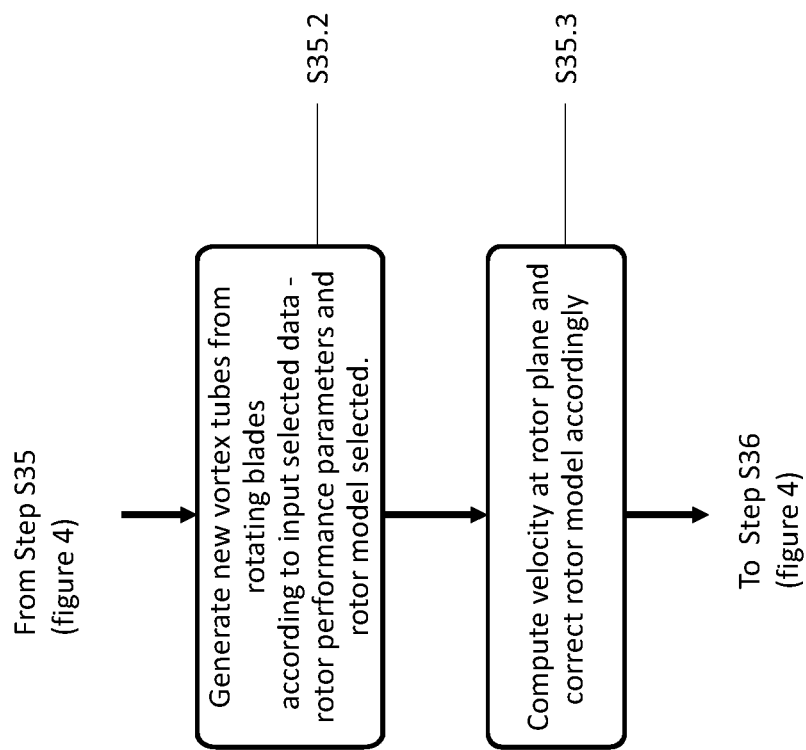
FIG. 14 shows an illustrative method for modeling turbulence caused by rotating rotor blades.

FIG. 14 shows a method of modeling turbulence caused by rotating rotor blades, for example in helicopters or wind turbine farms. The steps of the method in FIG. 14 occur during step S35 of FIG. 4. At step S35.2, the vortex tube generator 530 of CFD simulation system 505 generates new vortex tubes from rotating blades. The new vortex tubes may be based on, for example, rotor performance parameters (e.g., coefficient of thrust, tip speed) and rotor model, which may each be input by a user or obtained in any other manner. Examples of a rotor model include actuator disk, actuator line and actuator surface. The latter two may be referred to as the circulation theory of lift. In the case of actuator line, for example, at each time interval, N tubes are ejected from N prescribed points on each of the M rotating virtual blades with circulation r of each tube defined by:

$$\Gamma = Ct * R^2 * \Omega / M / N$$

Where Ct is the thrust coefficient, R is the rotor radius, and S2 is the rotor rotation speed. If Ct is not known, the circulation may be computed based on other technical specs of the rotor using other relationships.

In step S35.3, the CFD simulation system 505, for example the vortex tube generator 530, computes the velocity at the rotor plane due to tubes, sources, and vorticity sheets, and corrects rotor model. The rotor model in S35.2 that employs vorticity elements allows for accurate, physically consistent dynamics of the rotor wake. Since the wake and any other objects interfere to at least some extent with the flow at the rotor plane, the flow at the rotor plane must be corrected in real time.

The steps shown in FIG. 14 may be used by a wind turbine or wind turbine farm design system to generate a CFD simulation model that ejects vortex tubes from points on virtual rotor blades to satisfy an initial rotor plane (in/out) velocity field. The steps of FIG. 14 include a feedback mechanism that forces the vorticity shed from the rotor blades to be consistent with the time-dependent velocity field calculated at the rotor plane, and updates the rotor model to reflect changes in the flow that affect the rotor plane velocity field: for example, angular asymmetries due to proximity to other objects, interference due to wake and/or atmospheric turbulence, etc. The steps of FIG. 14 therefore may provide a more accurate model of turbulence caused by rotor blades, and therefore will allow for more accurate rotor and wind turbine and turbine farm design systems. Moreover, the steps of FIG. 14 may reduce the impact of interference, thereby providing substantial gains in power production in wind turbines. In addition, because interference can affect flight safety in helicopters (e.g., in take-off and landing scenarios, conditions, etc.), the resulting reduction in interference from the method of FIG. 14 may improve the safety of helicopters and other VTOLs. Moreover, the method of FIG. 14 is capable of taking into account the varying dynamics of a flow, whereas some existing systems (for example, the system described in C. G. Speziale, "On the advantages of the vorticity-velocity formulation of the equations," Journal of Computational Physics, vol. 73, no. 2, pp. 476-480, 1987, which is incorporated by reference herein in its entirety) involved approximations or ad-hoc empirical corrections.

Synthetic Jet

In one embodiment, the CFD simulation system 505 may be used to model synthetic jets. Synthetic jets may allow for modeling of a delayed flow separation over a solid surface, which may thereby reduce drag force. Synthetic jets are particularly useful in many industries, including automotive and aerospace applications because they may optimize performance and controllability.

The modeling of synthetic jets involves defining a synthetic jet inlet by a separate grid patch during pre-processing in step S10. The patch is defined as a boundary surface with a Von Neumann (velocity), time dependent boundary condition that matches synthetic jet conditions (e.g., ejection/suction of fluid, frequency of movement, etc.). Such a condition allows for effective, efficient and accurate modeling of a synthetic jet. With the modeling of such a synthetic jet, automobile and/or aerospace design systems, for example, may produce safer and more efficient vehicles or planes.

Filament Data Structure for Exascale

Exascale computing may reduce the execution time of complex simulations and may also allow for improved solutions at resolutions that are not otherwise available. For example, high fidelity hurricane tracking and trajectory predictions, which are a large-scale turbulent flow phenomenon, may be achieved quickly so that evacuation plans are based on accurate data. Among the concerns involved with implementing CFD simulation systems on exascale is reducing inter-node communications and minimizing the number of idle processors on the machines so as to take advantage of the processing capability of the exascale architecture.

The strategy for addressing the mismatch between the distribution of vortex filaments and the distribution the source and target points in the FMM by redistributing filaments to match the data distribution in the previous FMM step mitigates, but does not sufficiently reduce, the inter-node communication simply because the match almost never can be exact. Filaments tend to get large and span a significant portion of physical domain, and if the entire filament is on a single processor, this conflicts with the data distribution needs of the FMM where the centers and endpoints of the tubes represent the sources and targets, respectively. An efficient FMM partitions the physical domain with each processor's data being in some small, closed neighborhood of the global domain, which is in direct conflict with the requirement that a filament reside on a single processor.

When the number of nodes utilized is large, as with exascale computing, it is imperative that data remains local to the largest extent possible to both reduce inter-node communication and to keep processors busy. This is the motivation for the exascale filament data structure.

The exascale filament data structure representing a single filament is sufficiently general that the filament can be spread across processors to better match the data distribution in the FMM. FIGS. 6 and 7 show an example when filaments should be spread across multiple processors. Given a set of tubes in a filament, the processor that holds each tube is determined by the previous call to the FMM. The center of each tube represents a source point in FMM calculation and the processor that owns it is tracked. The movement of the points during the velocity calculation is limited by the time step and so the vast majority of the points, but not all, do not cross processor boundaries in a single time step. This significantly mitigates the inter-node communication and keeps a large portion of the data local.

The exascale filament data structure now contains snippets of the entire filament. Tubes that cross processor boundaries have at least 1 endpoint that resides on another processor. In this case, and assuming it is not the last tube on the filament, this endpoint is duplicated so each associated processor has a copy. These endpoints are tagged with information that links them across processor boundaries so data can be exchanged as needed. With this structure, splitting tubes due to stretching is straight forward.

The following documents, which are all incorporated by reference herein in their entirety, describe studies that show the unique benefits and accuracy of embodiments of the systems methods described herein:

Study 1: P. S. Bernard, P. Collins and M. Potts, "Vortex filament simulation of the turbulent boundary layer," AIAA Journal, vol. 48, no. 8, 2010.

Study 2: J. Krispin, "Extension of the Vorcat Technology to Moving Boundaries," Final Report on DOE Project DE-SC0007573, 2012.

Study 3: J. Krispin, "Development of Vorcat for Cloud Based Simulations," Final Report on NSF grant 1345444, 2014.

Study 4: J. Krispin, "Advanced Development for Defense Science," Final Report on DARPA Project W31P4Q-09-C-0548, 2010.

Study 5 J. Krispin, "Rotor-Airwake Aerodynamic Coupling in Real-Time Simulation," Final Report on NAVAIR contract N68335-11-C-0083, 2011.

Study 6: J. Krispin, "Development of Innovative, Non-Diffusive Vortex Method for Rotorcraft CFD Simulations," Final Report on NAVAIR contract N68335-14-C-0027, 2014.

Study 7: J. Krispin, "Analysis of Active Flow Control Concepts Using the 3D LES Vorcat Software," Final Report on NASA grant NNX16CL45P, 2016.

Study 8: C. a. B. C. Bogey, "Decrease of the effective Reynolds number with eddy-viscosity subgrid-scale modeling," AIAA J., vol. 43, pp. 437-439, 2005.

Study 9: P. Moin, "Numerical and physical issues in large eddy," JSME Int. J. B-Fluid, vol. 41, pp. 454-463, 1998.

These have included a study of isotropic turbulence (Study 1), shear layers (Study 2), coflowing round jet (Study 3) and boundary layers (Study 4). Of particular significance in these studies has been the close agreement with experimental statistics and known structural features. Many aspects of these results go well beyond the capabilities of traditional LES computations. Preliminary studies of benchmark flows about moving boundaries, (e.g., rotating spheres, flapping wing (Study 4) and a rotating, swept-back wind-turbine blade (Study 5)) showcase the unique attributes of the apparatus technology when applied to difficult problems. The simulation of several helicopter flows wherein the rotor is modeled (Studies 6-8), the simulation of synthetic jet flow over a hump (Study 9) and the flow over two Wind Energizers (WE) demonstrates strong wake-solid boundary and turbine wake on turbine interactions, respectively. In addition, some of these studies illustrate how the methods described herein require a lower level of expertise to operate and/or require less set up time.

Additional Illustrative Practical Applications

CFD simulation system 505 (FIG. 1) may be used provide flow data to control systems (e.g., via output 580 (FIG. 1)) to allow the control systems to operate efficiently. For example, CFD simulation data from CFD simulation system 505 performing some or all of the methods described above may be used to improve the operation of control systems for air jets, wind turbines, VTOLs.

For air jets used in the design of, for example, automotive and aerospace body shapes, synthetic jet simulations may be used to delay or reduce separation of flow over the surface of the body. As such, aerodynamic performance (e.g., reduction of drag over vehicles, delay of dynamic stall) may be improved if the air jet is based on simulation data.

An important issue in wind turbine farms is the relative placement of the wind turbines for a given topography so as to maximize energy production. Computing the power output of each turbine can be difficult due to interference and wake interactions (called "blockage") based on statistical atmospheric data. Computing the power output if is further complicated by the large number of wind turbines and the fact that each wind turbine may be controlled separately, varying wind conditions, varying pitch/yaw angles, etc. CFD simulation data may be used to control this pitch/yaw angle.

CFD simulation data may be used by controllers for autonomous VTOLS (drones) and/or manned VTOL flight simulators. VTOLs present difficult flow problems as described in J. Krispin, "Analysis of Active Flow Control Concepts Using the 3D LES Vorcat Software," Final Report on NASA grant NNX16CL45P, 2016, which is incorporated by reference herein in its entirety, and VTOL designs may involve wings that fold or rotate during flight, in addition to the rotor. In addition, VTOLs carry the primary concern of passenger safety and therefore the aerodynamic data under various conditions must be accurate.

CFD simulation data may also be used to control moving parts and systems on an automobile. For example, the position of the flap/wing/spoiler on race cars and sports cars may be controlled so as not to lose stability as the rear tires may tend to lift off the ground in high speed. In addition, static or adjustable fairings may be controlled so as to change the (aerodynamic) shape in real time. Even in the simple rear flap, the flow over the rear part of a body is complex. Some controllers are based on speed only: flap deployed at a certain speed and retracts at a lower speed. The difficulty arises when designing new shapes or changing existing shapes and, in the case of trucks, reduction of drag forces for a convoy of heavy trucks.

Figure 15:
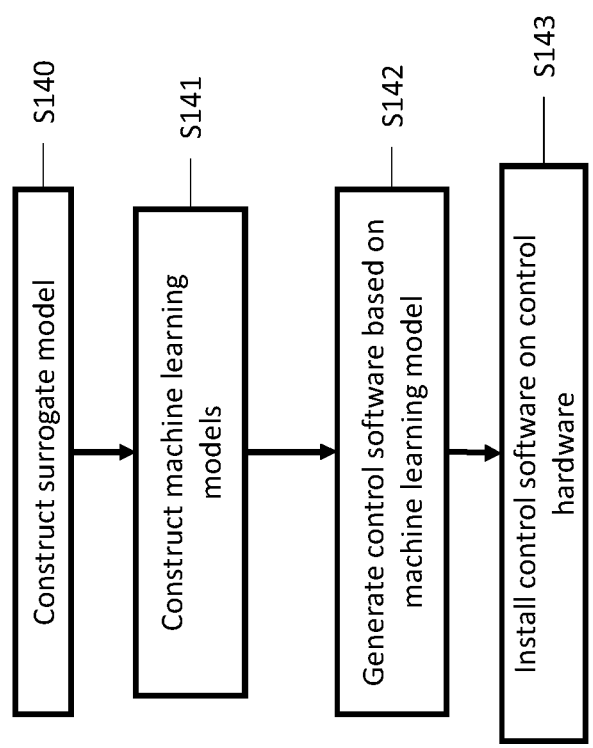
FIG. 15 shows an illustrative method for a controlling a control system based on a CFD simulation.

FIG. 15 shows an illustrative method for using a CFD simulation as the basis for a control system. At step S140, CFD simulation system 505 (FIG. 1) constructs a surrogate simulation model. The surrogate simulation model may be low fidelity, high fidelity or both low and high-fidelity. Illustrative parameters entered at step S10 (FIG. 2) are provided below based on the application or apparatus being controlled:

| Application | Illustrative arameters entered at step S10 (FIG. 2) |
|---|---|
| Air jet | Parameters that describe flow scenarios (e.g., ground or air vehicle) under various actuator performance parameters (e.g., frequency, momentum) |
| Pitch and yaw on wind turbine farms | parameters describing WTs flow scenarios (e.g., inland, offshore, topography, number of turbines, placements) under various performance parameters (e.g., turbine specs, wind conditions, waves) |
| VTOL | parameters describing VTOL flow scenarios (e.g., VTOL shape) under various performance parameters (e.g., takeoff, landing) proximity to ground and to objects in urban environments (buildings), proximity of VTOLs to each other of flying in swarms, and many more |
| Automotive (flap/wing/fairings) | parameters describing automotive flow scenarios (e.g., automotive configuration) under various performance parameters (e.g., speed, side wind) |

At step S141, machine learning models are created based on the surrogate simulation model and other inputs. Illustrative additional inputs to the machine learning model are provided below based on the application or apparatus being controlled:

| Application | Illustrative machine learning inputs |
|---|---|
| Air jet | pressure and speed |
| Pitch and yaw on wind turbine farms | wind profiles, wind turbine specifications, wind turbine locations (absolute and/or relative), pitch/yaw angles |
| VTOL | speed, vertical or forward or transition flight, proximity to ground or other objects |
| Automotive (flap/wing/fairings) | speed, proximity to other vehicles, deployment of flaps/wings |

At step S142, the machine learning model may be used to generate software for use by the appropriate hardware controller. At step S143, the software is installed on the appropriate hardware controller.

The embodiments described herein may be embodied as an article of manufacture in one or more computer programs stored on one or more recording mediums (e.g., floppy or optical disk, read access memory (RAM), read only memory (ROM), disk drive, etc.) to be inserted into a computer or other CFD simulation system (e.g., CFD simulation system 505, FIG. 1).

While embodiments of the invention have been described in detail in connection with the best mode of the invention currently known, it should be readily understood that the invention is not limited to the specified embodiments described herein. Rather, the invention can be modified to incorporate any number of variations, alterations, substitutions or equivalent arrangements not heretofore described, which are commensurate with the spirit and scope of the invention. For example, the fluid disclosed may be liquid, gas, chemical mixture, energy, or any process flow subject to evaluation.

Modifications are possible in the described embodiments, and other embodiments are possible, within the scope of the claims.

What is claimed is:

1. A system for simulation of computational fluid dynamics (CFD), the system comprising:
   an input device configured to receive an input parameter of a set of parameters indicative of:
      rotor blades rotating in a rotor plane associated with a vertical take-off and landing (VTOL) vehicle,
      rotor blades rotating in a rotor plane associated with a wind turbine,
      a moving automotive vehicle body shape, or
      a moving aerospace vehicle body shape;
   a vortex sheet construction unit configured to model the geometric shape of: the rotor blades rotating in a rotor plane associated with each of the VTOL or the wind turbine, or the moving automotive or aerospace vehicles' body shape; and
   a processing unit for modeling in a model fluid flow in relation to: the rotor blades rotating in a rotor plane associated with each of the VTOL or the wind turbine, or the moving automotive or aerospace vehicles' body shape, the processing unit configured to:
      compute a position of the rotor blades rotating in a rotor plane associated with each of the VTOL or the wind turbine, or the moving automotive or aerospace vehicles' body shape in an inertial frame model;
      transform velocity and vorticity data for the rotor blades rotating in a rotor plane associated with each of the VTOL or the wind turbine, or the moving automotive or aerospace vehicles' body shape to non-inertial frame;
      integrate equations in a non-inertial frame of each of the rotor blades rotating in a rotor plane associated with each of the VTOL or the wind turbine, or the moving automotive or aerospace vehicles' body shape in time by employing one or more boundary conditions of each of the rotor blades rotating in a rotor plane associated with each of the VTOL or the wind turbine, or the moving automotive or aerospace vehicles' body shape;
      transform vorticity data for the non-inertial frames to the inertial frame;
      compute a vorticity field for all the rotor blades rotating in a rotor plane associated with each of the VTOL or the wind turbine, or the moving automotive or aerospace vehicles' body shape objects in the inertial frame;
      integrate equations in the inertial frame and compute inertial velocity and vorticity; and
      release, advect and remove any vortex tube generated by a vortex sheet velocity processing unit in the inertial frame model.

2. The system of claim 1, wherein the processing unit is further configured to perform each of the steps for each of a plurality of the rotor blades rotating in a rotor plane associated with each of the VTOL or the wind turbine, or the moving automotive or aerospace vehicles' body shape in the inertial frame model at each of a plurality of time intervals.

3. The system of claim 1, wherein the processing unit comprises a vortex sheet velocity processing unit configured to perform the step of:
   computing a position of the rotor blades rotating in a rotor plane associated with each of the VTOL or the wind turbine, or the moving automotive or aerospace vehicles' body shape in the inertial frame model using $\vec{r}|_B = R \cdot \tilde{r}$, where $\tilde{r}$ is a position vector of the rotor blades rotating in a rotor plane associated with each of the VTOL or the wind turbine, or the moving automotive or aerospace vehicles' body shape in the inertial frame and is a time dependent rotation matrix constructed by multiplying rotation matrices about each coordinate of the moving object.

4. The system of claim 3, wherein the rotation R matrices are defined as:

$$\mathcal{R}_x(\alpha) = \begin{pmatrix} 1 & 0 & 0 \\ 0 & \cos(\alpha) & -\sin(\alpha) \\ 0 & \sin(\alpha) & \cos(\alpha) \end{pmatrix}$$

$$\mathcal{R}_y(\beta) = \begin{pmatrix} \cos(\beta) & 0 & \sin(\beta) \\ 0 & 1 & 0 \\ -\sin(\beta) & 0 & \cos(\beta) \end{pmatrix}$$

$$\mathcal{R}_z(\gamma) = \begin{pmatrix} \cos(\gamma) & -\sin(\gamma) & 0 \\ \sin(\gamma) & \cos(\gamma) & 0 \\ 0 & 0 & 1 \end{pmatrix}$$

5. The system of claim 3, wherein the vortex sheet velocity processing unit is configured to perform the step of: transforming vorticity data for each non-inertial frame to the inertial frame by calculating the vorticity data for each non-inertial frame's w, using:

$$\mathcal{R}^{-1} = \begin{pmatrix} \cos(\beta)\cos(\gamma) & \sin(\alpha)\sin(\beta)\cos(\gamma) - \cos(\alpha)\sin(\gamma) & \sin(\alpha)\sin(\gamma) + \cos(\alpha)\sin(\beta)\cos(\gamma) \\ \cos(\beta)\sin(\gamma) & \sin(\alpha)\sin(\beta)\sin(\gamma) + \cos(\alpha)\cos(\gamma) & \cos(\alpha)\sin(\beta)\sin(\gamma) - \sin(\alpha)\cos(\gamma) \\ -\sin(\beta) & \sin(\alpha)\cos(\beta) & \cos(\alpha)\cos(\beta) \end{pmatrix}$$

and then calculating absolute vorticity (W) in the inertial frame using:

$$W = \omega + 2\Omega$$

where $\Omega$ is the angular velocity of the non-inertial frame.

6. The system of claim 1, wherein the system is a vertical takeoff and landing (VTOL) design system.

7. The system of claim 6, wherein output from the system is provided to a VTOL control system.

8. A system for performing computational fluid dynamics (CFD) simulation, the system comprising: an input device configured to receive an input parameter of a set of parameters of rotor blades selected from a vertical take-off and landing (VTOL) vehicle, or a wind turbine, the rotor blades rotating in a rotor plane to be evaluated; a vortex sheet construction unit configured to model the geometric shape of the rotor blades rotating in the rotor plane; and a processing unit for simulating turbulence caused by rotor blades rotating in the rotor plane, the processing unit configured to:

generate; vortex tubes, of the rotating blades according to a rotor model selected from the group of actuator disk, actuator line and actuator surface; compute a velocity at the rotor plane due to vortex tubes, surface panels and vorticity sheets; and correct the rotor model according to the computed velocity, wherein the rotor model is an actuator line and at each time interval, N tubes are ejected from N prescribed points on each of the M rotating virtual blades with non-dimensional circulation F of each tube defined by: $\Gamma = C_t * R^2 * \Omega / M / N$ where Ct is a thrust coefficient, R is a rotor radius, and $\Omega$ is a rotor rotation speed.

\* \* \* \* \*